United States Patent [19]

Yao

[11] Patent Number: 5,654,818
[45] Date of Patent: Aug. 5, 1997

[54] POLARIZATION INDEPENDENT ELECTRO-OPTIC MODULATOR

[75] Inventor: Xiaotian Steve Yao, Diamond Bar, Calif.

[73] Assignee: The United States of America as represented by the United States National Aeronautics and Space Administration, Washington, D.C.

[21] Appl. No.: 599,200

[22] Filed: Feb. 9, 1996

[51] Int. Cl.$^6$ .................................................. G02F 1/035
[52] U.S. Cl. ................. 359/246; 359/254; 385/2; 385/3
[58] Field of Search ........................... 359/246, 254, 359/259, 192; 385/2, 3, 8

[56] References Cited

U.S. PATENT DOCUMENTS

| | | | |
|---|---|---|---|
| 4,718,120 | 1/1988 | Tzeng | 359/192 |
| 4,769,853 | 9/1988 | Goodwin et al. | 359/246 |
| 5,008,958 | 4/1991 | Cimini, Jr. et al. | 359/192 |
| 5,031,236 | 7/1991 | Hodgkinson et al. | 359/192 |
| 5,060,312 | 10/1991 | Delavaux | 359/192 |
| 5,069,520 | 12/1991 | Calvani et al. | 385/1 |
| 5,140,277 | 8/1992 | Hooijmans et al. | 329/302 |
| 5,142,402 | 8/1992 | Tsushima et al. | 359/192 |
| 5,263,102 | 11/1993 | Hakogi | 385/3 |
| 5,293,264 | 3/1994 | van Deventer | 359/192 |
| 5,301,058 | 4/1994 | Olshansky | 359/188 |
| 5,307,197 | 4/1994 | Tanabe et al. | 359/192 |
| 5,363,228 | 11/1994 | DeJule et al. | 359/117 |
| 5,400,417 | 3/1995 | Allie et al. | 385/2 |
| 5,574,805 | 11/1996 | Toba et al. | 385/3 |

FOREIGN PATENT DOCUMENTS 5-196903  8/1993  Japan .

Primary Examiner—Georgia Y. Epps
Assistant Examiner—Evelyn A. Lester
Attorney, Agent, or Firm—John H. Kusmiss

[57] ABSTRACT

A polarization insensitive electro-optic modulator is constructed by providing a polarization beamsplitter to separate an incoming light beam into two orthogonally plane polarized beams. Each of the polarized beams passes through a separate electro-optic modulator where each beam is modulated by the same data signal. After modulation the beams are combined to yield a modulated beam having modulated components that are orthogonally polarized. Not only is this device insensitive to changes in polarization of the input beam, the final modulated beam can be detected by optical receivers without regard to polarization alignment of the modulated beam and the receiver.

9 Claims, 3 Drawing Sheets

POLARIZATION INDEPENDENT ELECTRO-OPTIC MODULATOR

ORIGIN OF THE INVENTION

The invention described herein was made in the performance of work under a NASA contract, and is subject to the provisions of Public Law 96-517 (35 U.S.C. §202) in which the Contractor has elected not to retain title.

TECHNICAL FIELD

The present invention relates to the transmission of data through optical fibers and, more particularly, to an electro-optic modulator wherein the output signal power is insensitive to the direction of polarization of the input optical carrier beam.

BACKGROUND ART

Currently we are in the midst of an information revolution typified by the growing popularity of the internet and the worldwide web in particular. Supposedly we are on the brink of an information explosion where all types of data from current news to first run motion pictures on demand will be delivered to our homes. The big question is how this delivery will be accomplished. The bandwidth of telephone lines and even coaxial television cables is not adequate to the task. While it is possible that miniature satellite dishes could provide adequate bandwidth, it seems unlikely that such satellite service could provide the interactive communication envisioned by many experts. Therefore, the most likely means for delivering adequate data bandwidth to every home seems to be fiber optical cable. If fiber optical systems are to be successful, inexpensive and reliable optical transmitters (modulators) and receivers (demodulators) are essential.

The most promising modulators are various electro-optic devices such as a Mach-Zehnder waveguide modulator, in which an input light signal is separated into two light signals travelling two separate optical paths. An electric field modifies the optical path length of one of the paths, thus, phase modulating light passing through that path. At the output end the two signals are recombined and light interference converts the phase modulation into an amplitude modulation. These systems are highly favored because many of the essential components can be produced by integrated fabrication techniques analogous to those used in production of microelectronics. This should allow the production of small, inexpensive, highly reliable "integrated optic" devices.

Unfortunately, the current electro-optic modulating devices are extremely sensitive to the polarization plane of incoming light. This necessitates precise alignment of the laser relative to the modulator. Further, the light source must be extremely stable lest the plane of polarization change with time, thereby degrading the efficiency of the modulator.

Not only is the polarization of lasers apt to drift; optical fibers usually alter the polarization of light beams passing therethrough. This problem is greatly exacerbated if the fibers are bent or otherwise stressed. While there are special optical fibers that have virtually no effect on polarization, these polarization preserving fibers are much more expensive than the ordinary optical fiber. Therefore, there is considerable need for modulators that are immune to changes in polarization.

There has been considerable inventive effort expended in producing optical fiber systems that are insensitive to the polarization of incoming optical signals. One solution to the problem is to produce a receiver (demodulator) that is polarization insensitive. U.S. Pat. No. 4,718,120 to Tzeng uses a pair of polarization beamsplitters and a pair of delay demodulators which are sensitive to the outputs of a pair of optical balanced receivers to eliminate effects due to the plane of polarization of the incoming optical signal. U.S. Pat. No. 5,060,312 to Delavaux discloses a polarization insensitive coherent lightwave detection system using only a single polarization beamsplitter. U.S. Pat. No. 5,140,277 to Hooijmans et al. provides a different design for a polarization independent receiver employing one polarization beamsplitter. U.S. Pat. No. 5,142,402 to Tsushima et al. discloses a polarization diversity optical receiver employing one polarization beamsplitter and a frequency converter. U.S. Pat. No. 5,307,197 to Tanabe et al. discloses a simple polarization insensitive receiver based on three polarization beamsplitters and a double balanced receiver diode arrangement.

Another possible solution is to scramble the polarization of the signal beam by forcing signal polarization alternately into one or the other of two orthogonally polarized signal components. With this approach it is not possible for a polarization sensitive receiver to be simultaneously orthogonal to both signal components. At least one of the signal components will always be received, and if the scrambling frequency is sufficiently high compared to the data bit rate, the original data signal can be recovered. U.S. Pat. No. 5,008,958 to Cimini, Jr. et al. varies the polarization state of either the optical signal or the local optical oscillator (laser) using single mode high birefringent fibers to implement polarization switching. U.S. Pat. No. 5,031,236 to Hodgkinson et al. employs a voltage controlled optical switch to vary signal polarization by switching the optical signal alternately to one of two optical paths.

Yet another possibility is to use polarization modulation or switching in place of phase or amplitude modulation. With polarization switching the two binary data states produce orthogonally polarized signals. This way, at least one of the binary states will always be received by a polarization sensitive receiver, allowing the other state to be reconstructed, if necessary, from a properly coded data stream. Polarization switching can be accomplished by converting a phase modulated signal as is disclosed in U.S. Pat. No. 5,293,264 to van Deventer, where a high-order retarder is used to convert a phase modulated optical signal. Switching can also be directly accomplished by a special modulator, as is disclosed in U.S. Pat. No. 5,069,520 to Calvani et al.

Although the above mentioned devices and methods intends to solve polarization problems in heterodyne receivers in coherent optical communication systems. None of them concerns with polarization problems of modulators in the transmitters, especially when the laser source is located a distance away from the modulator.

STATEMENT OF THE INVENTION

The present invention provides a polarization insensitive system for optical fiber communication by providing a polarization insensitive modulator that modulates a light beam without sensitivity to polarization direction of the input beam.

A first polarization sensitive beamsplitter separates an input light beam into a first and second orthogonally polarized light beam. A first polarization rotator is capable rotating one of the polarized light beams about 90 degrees. The first polarized light beam can then be modulated, for example, by a Mach-Zehnder modulator in accordance with an appropriate electric signal to produce a first modulated beam. A second modulator such as a Mach-Zehnder modulator can modulate the second polarized light beam according to an electric signal to produce a second modulated beam. A second polarization rotator can rotate one of the modulated light beams about 90 degrees. Following the modulation, a second polarization beamsplitter can be used for combining the first and second modulated beams into a combined modulated beam containing orthogonally polarized modulated components.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

Figure 1:
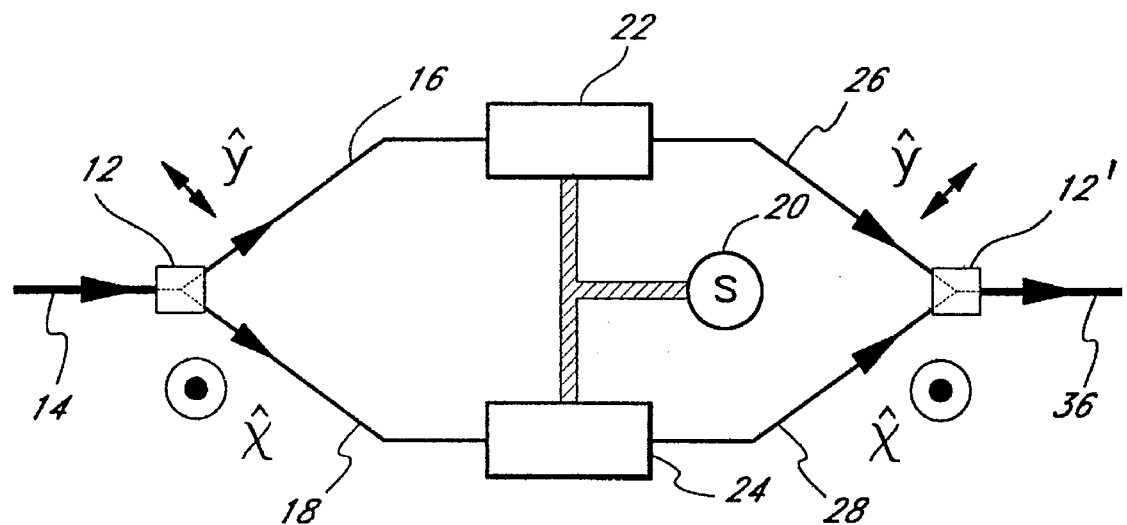
FIG. 1 shows a generalized diagram of a device of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an electro-optic modulator wherein the power of the modulated signal output is independent of the polarization of the input carrier signal.

All currently-used electro-optic modulating devices are polarization sensitive. For such devices to operate properly, the polarization state of the input light must be carefully selected and matched to the modulator. In addition, since the precise polarization state of some light sources is liable to drift with time, special care must be taken to stabilize the light source. Furthermore, because the state of polarization in a length of ordinary fiber may also change with time, caused by thermal and mechanical stresses, polarization maintaining fiber and related accessories are routinely used. These all add size, cost, and complexity to electro-optic modulators and fiber optic systems. Polarization maintaining fibers are difficult to handle and may be as much as 20 times as expensive as conventional single-mode fibers. A polarization insensitive system is needed for building a high data rate communication system needed for providing high resolution video, worldwide web access, and enhanced telecommunications.

A particularly vexing problem of the polarization sensitivity of electro-optic modulating device occurs were it is necessary to locate the source of light (i.e., the laser) at some distance from the modulating device. This may be essential, for example, where it is necessary to modulate a light signal according to an extremely high frequency radio signal. Here, it may not be possible to effectively conduct the radio signal away from the antenna. The solution is to place the light modulating device directly in the antenna (photonic antenna remoting and optically controlled phase array antennae). However, it is generally not practical to place a large, powerful laser in the antenna so the laser beam must be conducted to the antenna by means of inexpensive optical fiber. In this way one expensive laser can be used to deliver light beams to a plurality of antennae. This will work conveniently if the antenna-located optical modulator is polarization insensitive.

A related problem occurs when widely placed sensors are intended to return critical data over optical fibers as in a battlefield situation where neither radio transmissions nor metallic conductors are safe from detection or interference. It is possible to lay a concealed network of tiny optical fibers that conduct a source beam to the remote sensor and return a modulated beam therefrom. Certainly, large and expensive laser sources are neither practical nor economical on a battlefield. But if the sensors employ polarization insensitive modulators, it is possible to have a single remote laser, in a secure location, deliver the necessary light.

The present invention functions by separating the input light into two optical paths with the light beams in the two paths orthogonally polarized relative to each other. The separate polarized beams are properly aligned to be modulated by a conventional integral waveguide-type electro-optic modulator. Following modulation the orthogonally polarized beams are recombined to produce a combined modulated beam with orthogonally polarized components that can be readily detected by either polarization sensitive or polarization insensitive optical receivers.

FIG. 1 shows a general diagram of a first embodiment of an electro-optical modulator of the present invention. An input light beam 14 passes through a polarization beamsplitter/coupler 12 which divides the beam into two orthogonally polarized beams, a first beam 16 linearly polarized in a direction parallel to the plane of the page (y direction) and perpendicular to the propagation direction the first beam 16, and a second beam 18 linearly polarized in a direction perpendicular to the plane of the page (x direction) and perpendicular to the direction of propagation of the second beam 18.

The first beam 16 is polarized in the optimum direction to interact with a first electro-optic modulator 22 which amplitude modulates the first light beam 16 according to a signal source 20 to produce a first modulated beam 26. The second beam 28 is modulated by a second electro-optic modulator 24, which is also driven by the same signal source 20 to produce a second modulated beam 28. Both modulated beams are modulated with the same signal, but are orthogonally plane polarized relative to each other. Finally, a second polarization beamsplitter/coupler 12' recombines the first modulated beam 26 and the second modulated beam 28 to produce a combined modulated beam 36 having orthogonally polarized modulated components.

Figure 2:
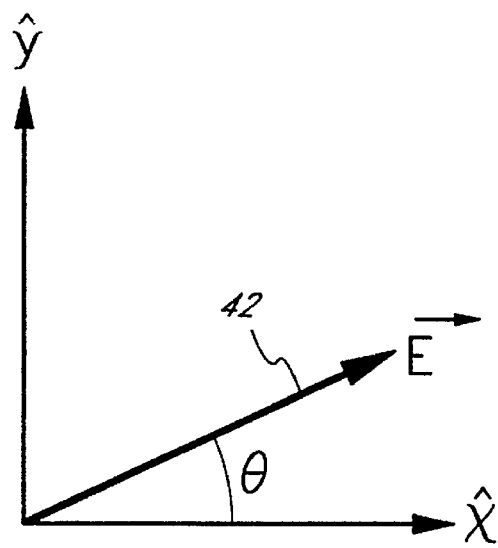
FIG. 2 shows a diagram illustrating the decomposition of a light beam into orthogonally polarized beams.

FIG. 2 diagrammatically shows how the electric field (E) and the optical power (P) of an input polarized light beam 42 is decomposed into orthogonally polarized beams with their electrical fields parallel to the x any y axes of the diagram. In this example the polarization plane of beam 42 makes an angle θ with the x-y coordinate axes. The x vectors and the y vectors of the beam 42 are separated according to:

$$\hat{E} = E_{in}(\cos\theta \hat{x} + \sin\theta \hat{y}) \qquad (1)$$

where $E_{in}$ is the amplitude of the input field. The optical powers of the x component $P_x$ and the y component $P_y$ can be expressed as:

$$P_x = P_{in}\cos^2\theta \qquad (2)$$

$$P_y = P_{in}\sin^2\theta \qquad (3)$$

where $P_{in} \propto |E_{in}|^2$ is the total optical power. It is clear from Equation (2) and Equation (3) that:

$$P_{in} = P_x + P_y \qquad (4)$$

Assuming that the modulators 22, 24 are of amplitude modulation type, after the beams have passed through the modulators 22, 24, the optical powers $P'_x$ and $P'_y$ of the two beams can be expressed as:

$$P'_x = \alpha_1 P_x \cos^2\{\phi_1[V(t)] + \phi_{10}\} \qquad (5)$$

$$P'_y = \alpha_2 P_y \cos^2\{\phi_2[V(t)] + \phi_{20}\} \qquad (6)$$

where $\alpha_1$ and $\alpha_2$ are the loss factors of the two modulators 22, 24, $\phi_1$ and $\phi_2$ are functions of the modulation voltage $V(t)$ from the signal source 20 and are determined by modulator parameters, and $\phi_{10}$ and $\phi_{20}$ are initial phases determined by bias voltages of the modulators 22, 24.

After the modulated beams 26, 28 are combined by the polarization combiner 12, the total output power $P_{out}$ is:

$$P_{out} = \alpha_1 P_x \cos^2\{\phi_1[V(t)] + \phi_{10}\} + \alpha_2 P_y \cos^2\{\phi_2[V(t)] + \phi_{20}\} \qquad (7)$$

If the two modulators 22, 24 are identical, where $\alpha_1 = \alpha_2 \equiv \alpha$, $\phi_{10} = \phi_{20} \equiv \phi_0$, and $\phi_1 = \phi_2 \equiv \phi$, then Equation (7) can be simplified as:

$$P_{out} = \alpha(P_x + P_y)\cos^2\{\phi[V(t)] + \phi\} = \alpha P_{in} \cos^2\{\phi[V(t)] + \phi\} \qquad (8)$$

From Equation (8) one can readily see that the output power of the combined modulated beam 36 is independent of the polarization angle $\theta$ of the input light beam 14. This is intuitively obvious because the sine and cosine functions of Equations 3 and 4 are reciprocal. Essentially all of the light energy P is split between $P_x$ and $P_y$. If changes in $\theta$ cause one beam to increase, the other will decrease proportionally and vice versa. The total power of the final combined modulated beam 36 remains a direct and constant function of the power of the input beam 14.

Note that in case two modulators 22, 24 are not identical, the splitting ratio of signal 20 can be adjusted to compensate for the differences. In addition, the bias voltage of the modulators 22, 24 can also be independently adjusted for some degrees of compensation.

On the other hand, if the two modulators 22, 24 are of phase modulation type, the total electrical field after polarization beam combiner 12' can be written as:

$$\vec{E}_{out} = E_{in}\{\alpha_1\cos\theta e^{i\phi_1[V(t)] + i\phi_{10}}\hat{x} + \alpha_2\sin\theta e^{i\phi_2[V(t)] + i\phi_{20}}\hat{y}\} \qquad (9)$$

Again, if the two modulators 22, 24 are identical, where $\alpha_1 = \alpha_2 \equiv \alpha$, $\phi_{10} = \phi_{20} \equiv \phi_0$, and $\phi_1 = \phi_2 \equiv \phi$, then Equation (7) can be simplified as:

$$\vec{E}_{out} = \alpha E_{in}[\cos\theta\hat{x} + \sin\theta\hat{y}]e^{i\phi[V(t)] + i\phi} = \alpha \vec{E} e^{i\phi[V(t)] + i\phi} \qquad (10)$$

It is now evident from Equation (10) that the output is independent of polarization angle.

Figure 3:
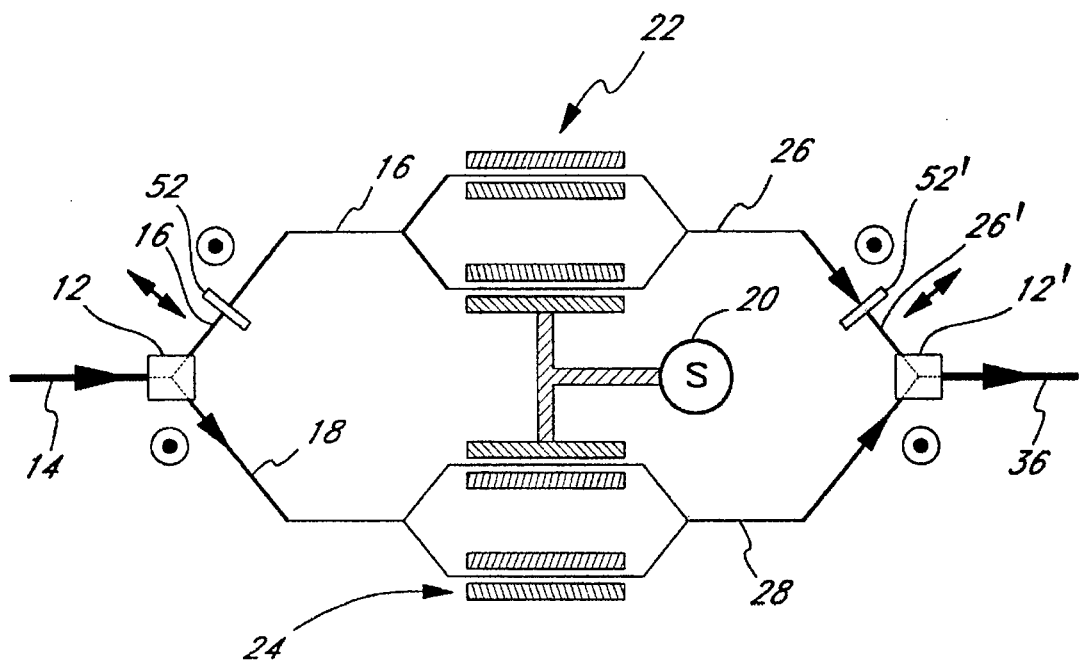
FIG. 3 is a diagram of an implementation of the present invention using two Mach-Zehnder modulators.

FIG. 3 shows one way of implementing the present invention for polarization independent amplitude modulation. The device shown diagrammatically in FIG. 3 is very similar to the generic device of FIG. 1; however, the Mach-Zehnder devices require that an input beam be polarized in the x rather than in the y direction. Therefore, after the input beam 14 is separated into two beams by the polarization beamsplitter 12, the resulting first beam 16, which is polarized in the y direction, passes through a 90-degree polarization rotator 52 which converts it into a beam 16', polarized in the x direction. Thereafter the rotated beam 16' enters the first modulator 22, a Mach-Zehnder device. As in the generic device, this modulator 22 is driven by the signal source 20 to produce a first modulated rotated beam 26. After passing through a second polarization rotator 52', beam 26 is converted to a rotated beam 26' by having it's polarization rotated back to y direction.

Similarly, the second polarized beam 18 (x direction) passes through the second modulator 24 (also a Mach-Zehnder device) to yield the second modulated beam 28, also polarized in the x direction. At polarization beam combiner 12', it combines with beam 26' to produce a combined amplitude modulated beam 36 that is independent of the input polarization angle.

Figure 4:
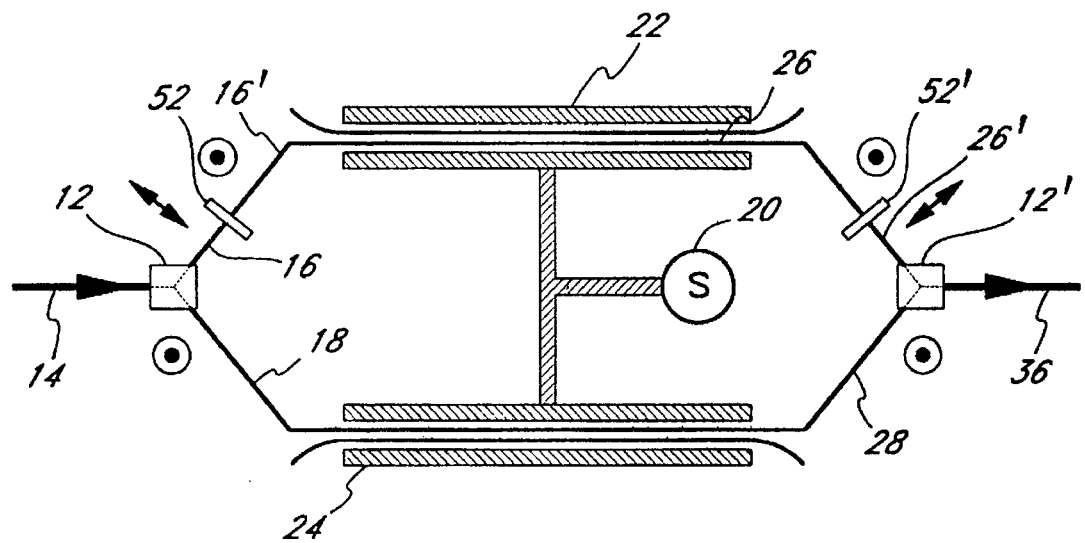
FIG. 4 illustrates an implementation of the present invention using two directional coupler modulators.

FIG. 4 demonstrates another type of waveguide modulator being used in the embodiment of FIG. 1. Here two directional couplers are used as the two modulators 22, 24. Like the Mach-Zehnder devices of FIG. 3 the direction couplers require input beams polarized in the x direction. Therefore, polarization rotators 52, 52' are used to rotate the first polarized beam 16 and the first modulated beam 26' before and after modulation, respectively.

Figure 5:
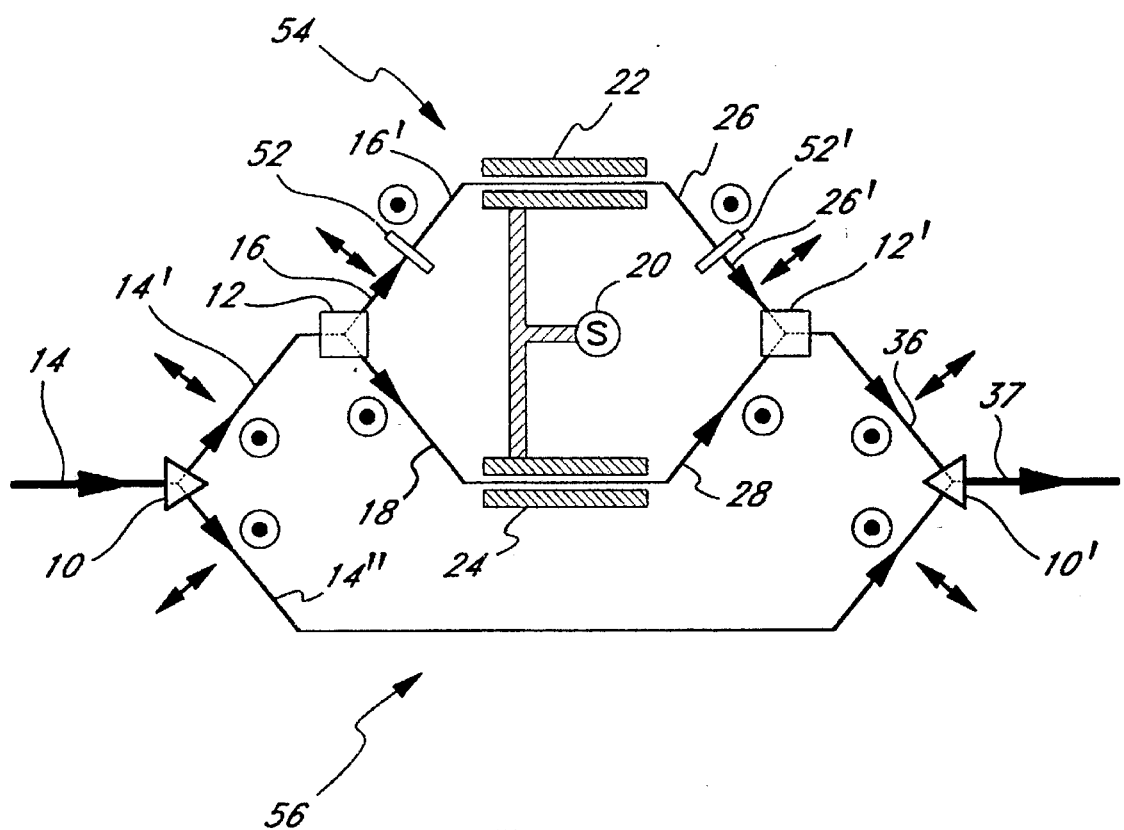
FIG. 5 shows a diagram of a second embodiment of the present invention containing a signal arm and a reference arm.

FIG. 5 illustrates a second embodiment of the polarization insensitive modulator of the present invention. Basically, it converts a polarization insensitive phase modulator of Equation (10) into a polarization independent amplitude modulator. The device contains two parts: a signal arm which contains a polarization independent phase modulator of the types used in the first embodiment of FIG. 1, and a reference arm for providing an modulated reference component. The input beam 14 is first divided into two input beams 14', 14" by a polarization insensitive beamsplitter 10. A reference arm 56 allows the input beam 14" to pass through without alteration. The light in the signal arm is further separated into two beams 16, 18 by a polarization beamsplitter 12. Assuming phase modulators 22, 24 work most efficiently with x polarization, y polarized beam 16 must be first converted into a x polarized beam 16' by a polarization rotator 52. Both beams 16', 18 are phase-modulated by the same signal 20 with an equal phase modulation to become modulated beams 26, 28. Phase-modulated beam 26 is then converted to beam 26' with its polarization rotated back to y polarization by a second polarization rotator 52' to become beam 26'. Finally, the combined phase modulated beam 36 is recombined with the input beam 14" by a second polarization insensitive beamsplitter/coupler 10'. The interference of beams 14" and 36 yields a final combined beam 37 which is amplitude modulated.

At the output of the first polarization insensitive beamsplitter/coupler 10, the electrical fields $E_r$ and $E_s$ of the light in the reference arm 56 and in the signal arm 54 can be expressed as:

$$\vec{E}_r = \frac{\sqrt{\alpha_r}}{\sqrt{2}}(E_x\hat{x} + E_y\hat{y})\exp(i\phi_r) \qquad (11)$$

$$\vec{E}_s = \frac{1}{\sqrt{2}}\{\sqrt{\alpha_1}\,E_x\hat{x}\exp[i\phi_1\{V(t) + i\phi_{10})] + \\ \sqrt{\alpha_2}\,E_y\hat{y}\exp[i\phi_2(V(t) + i\phi_{20})]\} \qquad (12)$$

Where $E_x$ and $E_y$ are the amplitudes of the input light electrical fields in the x and y directions, respectively, $\theta_r$ and $\alpha_r$ are the total phase shift and the total optical loss of the reference arm. In Equation (11) $\phi_1$ and $\phi_2$ are the phase modulations in the first and the second signal pathways, respectively, and are functions of the driving voltage V(t). $\phi_{10}$ and $\phi_{20}$ are constant phase shifts in the two signal paths, and $\alpha_1$ and $\alpha_2$ are the corresponding optical losses.

After combination at the beamsplitter/coupler 10', the total electrical field is:

$$\vec{E}_{out} = \frac{1}{\sqrt{2}} (\vec{E}_r + \vec{E}_s). \tag{13}$$

The total optical power $P_{out}$ is proportional to $E_{out}E^*_{out}$ and can be written as:

$$P_{out} = \frac{A}{2} \{|E_x|^2[\alpha_r + \alpha_1\cos(\phi_1 + \phi_{10} - \phi_r)] + \tag{14}$$
$$|E_y|^2[\alpha_r + \alpha_2\cos(\phi_2 + \phi_{20} - \phi_r)]\}$$

where A is the proportionality constant. If the two phase modulators are identical so that $\alpha_1=\alpha_2=\alpha_s$, $\phi_1=\phi_2=\phi_s$, and $\phi_{10}=\phi_{20}=\phi_{s0}$, Equation (12) simplifies to:

$$P_{out} = \frac{P_{in}}{2} \{\alpha_r + \alpha_s\cos[\phi_s(V(t)) + \phi_{20} - \phi_r]\} \tag{15}$$

In Equation (15), $P_{in}=A(E_x^2+E_y^2)$. This equation makes it evident that the output power is independent of the polarization angle $\theta$ of the input beam 14. Compared with the polarization independent modulator of FIG. 3, this embodiment has fewer optical branches and, therefore, is less complicated and has a lower optical loss.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A polarization independent optical modulator comprising:
   polarization separating means for separating an input light beam into a first and a second orthogonally polarized light beam;
   first modulating means for modulating the first polarized light beam according to an electric signal to produce a first modulated beam;
   second modulating means for modulating the second polarized light beam according to the electric signal to produce a second modulated beam; and
   polarization combining means for combining the first and the second modulated beam into a combined modulated beam containing orthogonally polarized modulated components.

2. The modulator of claim 1, wherein the first and the second modulating means are phase modulators, wherein a first polarization insensitive beamsplitter divides the input beam into a signal and a reference beam prior to the polarization separating means, the signal beam passing through the polarization separating means, and wherein a second polarization insensitive beamsplitter combines the reference beam and the combined phase modulated beam after the polarization combining means to convert the combined phase modulated beam into an amplitude modulated beam.

3. The modulator of claim 1 further comprising optical rotating means for rotating one of the polarized light beams about 90 degrees prior to modulation by the modulating means and for rotating one of the resulting modulated beam about 90 degrees prior to encountering the polarization combining means.

4. The modulator of claim 3, wherein the modulating means are provided by Mach-Zehnder modulators.

5. The modulator of claim 3, wherein the modulating means are provided by directional coupler modulators.

6. A polarization independent optical modulator comprising:
   a first polarization beamsplitter for separating an input light beam into a first and a second orthogonally polarized light beam;
   a first polarization rotator for rotating one of the polarized light beams about 90 degrees;
   a first Mach-Zehnder modulator for modulating the first polarized light beam according to an electric signal to produce a first modulated beam;
   a second Mach-Zehnder modulator for modulating the second polarized light beam according to the electric signal to produce a second modulated beam;
   a second polarization rotator for rotating one of the modulated light beams about 90 degrees; and
   a second polarization beamsplitter for combining the first and the second modulated beams into a combined modulated beam containing orthogonally polarized modulated components.

7. A polarization independent optical phase modulator comprising:
   a first polarization beamsplitter for separating an input light beam into a first and a second orthogonally polarized light beam;
   a first polarization rotator for rotating one of the polarized light beams about 90 degrees;
   a first directional coupler modulator for modulating the first polarized light beam according to an electric signal to produce a first modulated beam;
   a second direction coupler modulator for modulating the second polarized light beam according to the electric signal to produce a second modulated beam; and
   a second polarization rotator for rotating one of the modulated light beams about 90 degrees;
   a second polarization beamsplitter for combining the first and the second modulated beams into a combined modulated beam containing orthogonally polarized modulated components.

8. A polarization independent optical amplitude modulator comprising:
   a first polarization insensitive beamsplitter for separating an input beam into equivalent signal and reference light beams;
   a signal arm for phase modulating the signal light beam, the signal arm comprising:
      polarization separating means for separating the light beam into a first and a second orthogonally polarized light beam;
      first phase modulating means for phase modulating the first polarized light beam according to an electric signal to produce a first phase modulated beam;

second phase modulating means for phase modulating the second polarized light beam according to the electric signal to produce a second phase modulated beam; and polarization combining means for combining the first and the second modulated beam into a combined phase modulated beam containing orthogonally polarized phase modulated components; and a second polarization insensitive beamsplitter for combining the reference beam and the combined modulated beam for producing an output beam containing amplitude modulated components produced through interference between the signal and the reference beams.

9. The modulator of claim 8, wherein the signal arm further comprises optical rotating means for rotating one of the polarized light beams about 90 degrees prior to modulation by the modulating means and for rotating one of the resulting modulated beam about 90 degrees prior to encountering the polarization combining means.

* * * * *